United States Patent [19]

Desimone et al.

[11] Patent Number: 5,339,482
[45] Date of Patent: Aug. 23, 1994

[54] TOOTHBRUSH HAVING NON-SLIP SURFACE

[75] Inventors: Joseph A. Desimone, Bricktown; Richard A. Goldinger, Princeton, both of N.J.

[73] Assignee: Johnson & Johnson Consumer Products, Inc., Skillman, N.J.

[21] Appl. No.: 918,717

[22] Filed: Jul. 21, 1992

[51] Int. Cl.$^5$ .............................. A46B 9/04
[52] U.S. Cl. ................... 15/167.1; 15/143.1
[58] Field of Search ............ 15/167.1, 167.2, 143.1, 15/110, 160; D4/104; 81/22, 489

[56] References Cited

U.S. PATENT DOCUMENTS

| | | | |
|---|---|---|---|
| 305,385 | 1/1890 | Schneider | D4/104 |
| 305,386 | 1/1890 | Rams et al. | D4/104 |
| 318,760 | 8/1891 | Kreisher et al. | D4/104 |
| 320,117 | 9/1891 | Shalvi | D4/104 |
| 324,775 | 3/1892 | Kreisher et al. | D4/104 |
| 2,094,240 | 9/1937 | Herrick et al. | 15/167.1 |
| 2,179,266 | 11/1939 | Lukenbill | 15/145 |
| 2,489,707 | 11/1949 | Eubanks | 15/167.1 |
| 2,814,818 | 12/1957 | Birse | 15/143 |
| 2,823,404 | 2/1958 | Hyman | 15/167.1 |
| 3,139,094 | 6/1964 | Efeian | 132/84 |
| 3,302,230 | 2/1967 | Poppelman | 15/167.1 |
| 3,542,519 | 11/1970 | Montalto et al. | 15/167.1 X |
| 3,589,823 | 6/1971 | Hendrickson | 15/167.1 X |
| 3,680,169 | 8/1972 | Thompson | 15/176 |
| 4,137,593 | 2/1979 | Porper | 15/167.1 |
| 4,283,808 | 8/1981 | Beebe | 15/145 |
| 4,493,125 | 1/1985 | Collis | 15/167.1 |
| 4,672,706 | 6/1987 | Hill | 15/167.1 |
| 4,706,322 | 11/1987 | Nicolas | 15/106 |
| 4,721,021 | 1/1988 | Kusznir | 81/22 |
| 4,724,570 | 2/1988 | Hitzman | 15/167.1 |
| 4,726,806 | 2/1988 | Hukuba | 15/167.1 X |
| 4,800,608 | 1/1989 | Key | 15/167.1 |
| 5,001,803 | 3/1991 | Diecko | 15/167.1 |
| 5,052,071 | 10/1991 | Halm | 15/167.1 |
| 5,054,154 | 10/1991 | Schiffer et al. | 15/167.1 |
| 5,115,533 | 5/1992 | Hukuba | 15/143.1 |

OTHER PUBLICATIONS

"Zahoransky's Fully Automatic Two-Color Mould," *Brossa Press*, Feb 1989.

*Primary Examiner*—Timothy F. Simone
*Assistant Examiner*—Patrick F. Brinson

[57] ABSTRACT

A toothbrush having a non-slip region on its handle to facilitate better manipulation of the brush is disclosed. An insert having a surface with raised ribs is formed in a separate molding operation and then inserted within an aperture formed in the toothbrush handle. A method for manufacturing the toothbrush is also disclosed.

11 Claims, 4 Drawing Sheets

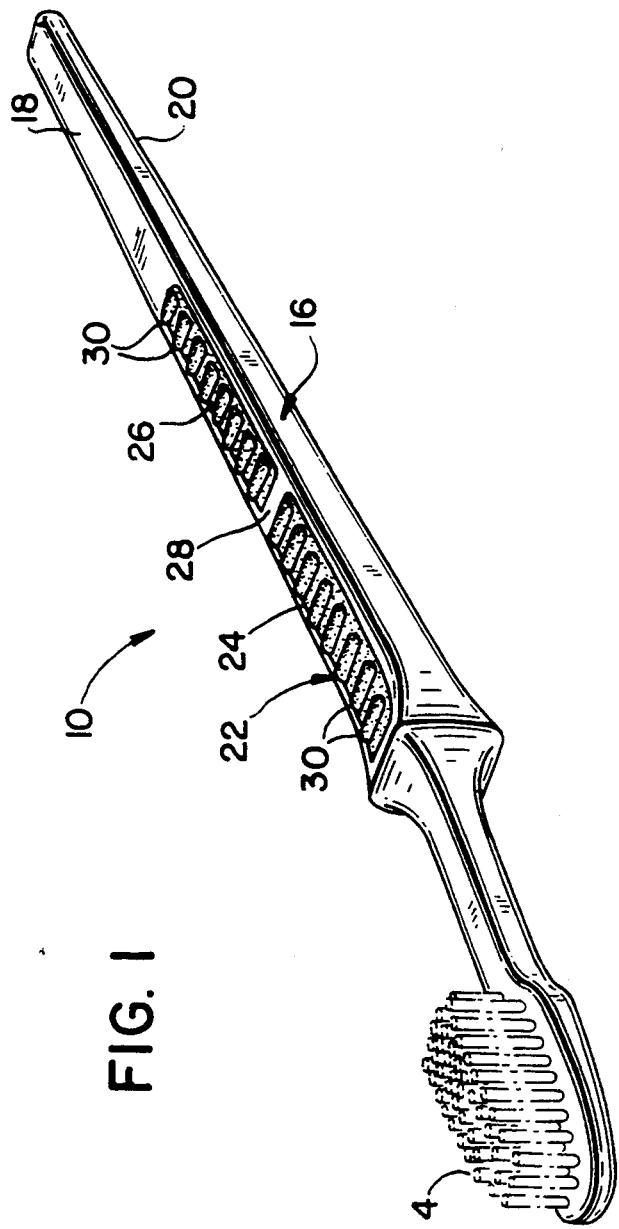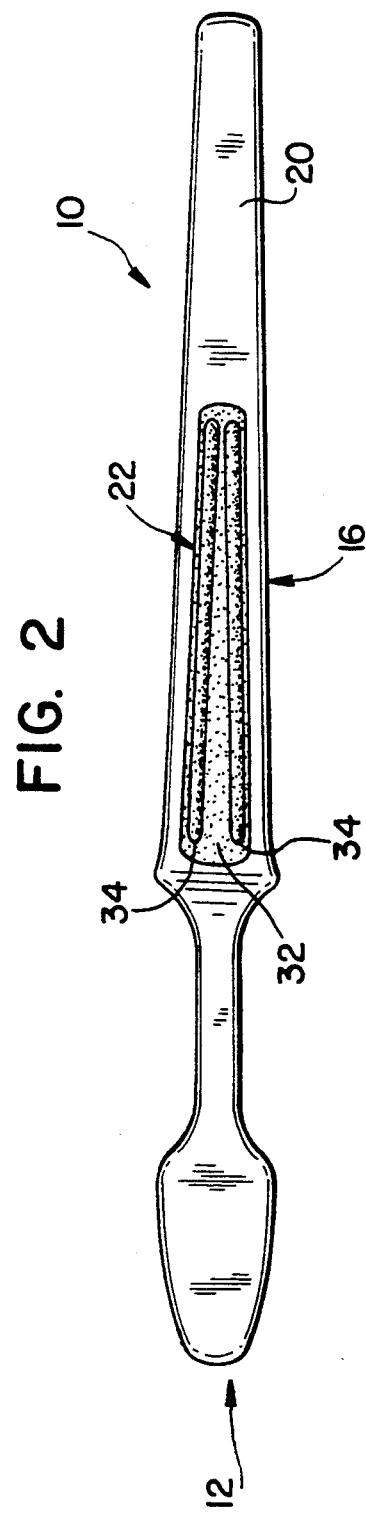

TOOTHBRUSH HAVING NON-SLIP SURFACE

FIELD OF THE INVENTION

The present invention relates to a toothbrush, and more particularly to a toothbrush handle having a non-slip surface.

BACKGROUND OF THE INVENTION

Various techniques have been suggested for modifying the handle of a toothbrush to facilitate better manipulation of the brush during use. For instance, U.S. Pat. No. 2,179,266 to Lukenbill describes a grip attachment in the form of a tubular sleeve containing opposed bearing portions for engaging the thumb and index finger of the user's hand. In one embodiment, the attachment is fabricated from a rubber-like material which allows the tubular sleeve to be stretched over the toothbrush handle and frictionally engage the underlying surfaces of the handle. Each of the bearing surfaces on the sleeve have an area which is larger than that of the handle, which makes it easier for the user to grip the toothbrush.

U.S. Pat. No. 4,283,808 to Beebe also describes a detachable gripping device for a toothbrush. The device consists of an elongated plastic foam body having a diameter which can be readily gripped by the user of the toothbrush. The plastic body also includes a centrally disposed longitudinal slot adapted to receive and engage the toothbrush handle.

Gripping devices which are not detachable, but integrally formed in the toothbrush handle, have also been suggested. U.S. Pat. No. 2,094,240 to Herrick, et al., describes a toothbrush handle having a pair of shallow cavities disposed in an opposed configuration to receive the thumb and index finger of the user. The floor of each cavity contains a plurality of grooves, which form a non-slip surface for engagement by the user's finger and thumb.

Other techniques for providing a non-slip surface on a toothbrush include texturing selected portions of the handle. For example, U.S. Pat. No. 4,137,593 to Porper describes a toothbrush handle with a serrated or ribbed surface. The serrated or ribbed surface is formed on the portion of the toothbrush handle that is engaged by the user's thumb. U.S. Pat. No. 4,672,706 to Hill also describes a toothbrush handle which is textured to provide a non-slip gripping surface. The textured portion of the handle has a substantially elliptical cross-section and the texturing extends around the entire periphery of the handle.

Toothbrushes having a handle portion fabricated from two different materials are also known. U.S. Pat. No. 5,054,154 to Schiffer, et al., describes a toothbrush having a handle and a bristled head which are connected by a neck portion. A series of clearances, slots or grooves, filled with an elastic, rubbery material, are formed in the portion of the handle adjacent the neck. The filling of these clearances, slots or grooves with the rubbery material takes place after the toothbrush handle and head have been manufactured. These rubber-filled areas form an elastic, flexible zone in the toothbrush which causes the bristled head to deflect or move out of the way when excessive force is used to brush the teeth. This feature is said to prevent injury to the gums and teeth in the event of excessive brushing pressure.

Toothbrushes having raised rib portions on the handle have also been suggested. U.S. Design Pat. Nos. 318,716 and 324,775 to Kreisher, et al., are examples of such toothbrushes. These ribs are often fabricated from a material which is different from the remainder of the toothbrush. Toothbrushes containing raised rubber ridges or dimples are commercially available.

A fully automated process for forming toothbrush handles from separate or different colored materials is described in an article entitled "Zahoransky's Fully Automatic Two-Color Mold," *Brossa press*, 1989. This automated process avoids the need to mount or paste the second material, such as rubber, manually onto the toothbrush handle. In the first step of the process, the plastic material which forms the bulk of the toothbrush is vertically injected into the cavity of the mold. The resulting structure is a partially formed toothbrush having a handle with a series of void spaces. The partially formed toothbrush is then automatically moved into a second cavity within the same mold, where a second or different colored material is injected horizontally to complete the toothbrush handle. The second mold cavity is generally contoured so that raised ribs or dimples are formed on the toothbrush handle to provide a non-slip surface. Generally, the first material forming the bulk of the toothbrush is polypropylene while the second material is Santoprene ® rubber. The same material, but colored with two different pigments, may also be used in the process to form a multi-colored toothbrush.

The second material injected into the partially formed toothbrush fuses with the polypropylene or other material forming the bulk of the handle. This second material cannot be torn from the handle, and remains durable for the lifetime of the article.

These automated two-color or two-material molds produce bicomponent toothbrushes of good quality. However, the capital investment for this equipment is significant, so it is generally only used in manufacturing facilities where the level of output justifies the capital cost. In plants where there is insignificant volume to justify this level of capital investment, a need has developed for a bicomponent toothbrush having a non-slip handle which can be manufactured with conventional molding equipment.

SUMMARY OF THE INVENTION

The present invention relates to a toothbrush having a bristled head connected to a handle. An aperture is formed in the toothbrush, and defines an opening in at least one surface of the handle. An insert having at least one non-slip surface is disposed in the aperture, so that the non-slip surface is exposed through the opening formed in the handle.

The insert is not formed in situ within the handle as in the Zahoransky process, but is manufactured in a separate mold and then inserted into the aperture. A securing means may also be provided for securing the insert within the aperture. In one preferred form, a region of the insert wall is disposed in an interlocking relationship with a region of the aperture wall, thereby securing the insert to the handle. If the aperture is fabricated from a material which is sufficiently compressible, it is simply compression-fit within the aperture.

The aperture may also extend through the handle, so that an opening is formed on both the top and bottom surface of the toothbrush. The insert has a non-slip surface on its top and bottom surfaces, so that non-slip regions are formed on the top and bottom surfaces of the handles.

The present invention also includes a method for forming the toothbrush having a non-slip surface on the handle.

BRIEF DESCRIPTION OF THE DRAWINGS

FIG. 1 is a perspective view of the toothbrush in accordance with the present invention.

FIG. 2 is a bottom plan view of the toothbrush of FIG. 1.

DETAILED DESCRIPTION OF THE PREFERRED EMBODIMENTS

Figure 3:
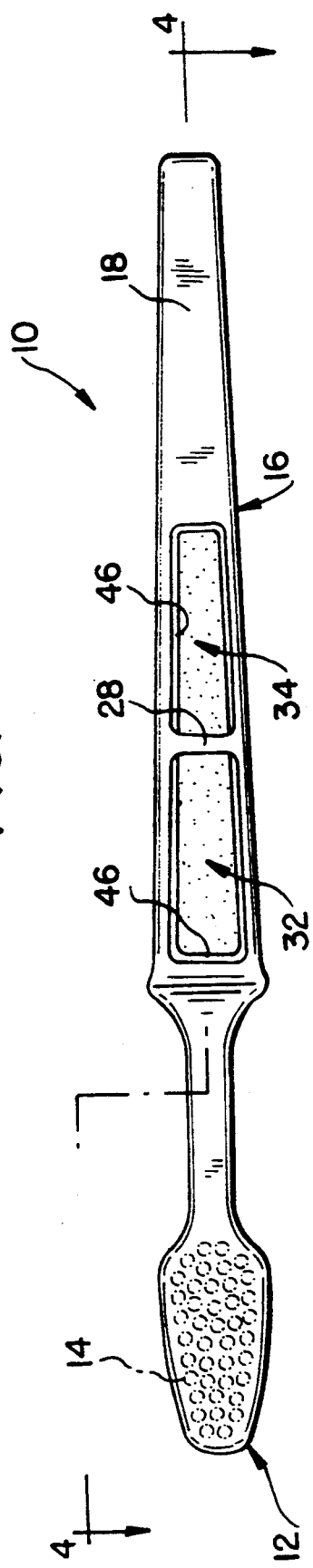
FIG. 3 is a top plan view of the toothbrush of FIG. 1 with the insert removed.

Referring now to the drawings, where like reference numerals have been used to designate like or similar elements, there is shown in FIGS. 1 and 2 a toothbrush of the present invention having the general designation 10. The toothbrush 10 has a head 12 with a plurality of bristles 14. The head 12 is connected to a handle 16 having a top surface 18 and a bottom surface 20. Although the toothbrush handle 16 is shown to be substantially rectangular, with the top and bottom surfaces 18 and 20, respectively, forming opposed major surfaces, it should be understood that virtually any handle configuration may be employed in the present invention, including a cylindrical handle with only one major surface.

The handle 16 contains an insert 22 which is disposed in the portion of the handle that is typically engaged by the thumb and index finger of the user's hand. The insert 22 contains a first non-slip surface 24 and a second non-slip surface 26 generally contiguous with the top surface 18 of the handle 16. The non-slip surfaces 24 and 26 contain a plurality of raised ribs 30 which form non-slip regions on the top surface 18 of the handle 16. These non-slip regions are engaged by the user's thumb to facilitate better manipulation of the brush.

Although the toothbrush 10 is shown as having an insert 22 with non-slip surfaces 24 and 26 separated by a bridge portion 28 in the handle 16, it should be understood that virtually any configuration of the insert within the handle may be employed. For example, it may be desirable to eliminate the bridge portion 28 in the handle 16 so that the non-slip region is continuous along the top surface 18. It may also be desirable to have a plurality of inserts disposed in the handle 16. Furthermore, the transverse ribs 30 may be replaced with raised dimples, longitudinal ribs or other textured patterns. Depending upon the material employed to fabricate the insert 22, the non-slip surface may be smooth so long as it provides a good gripping surface for the user's thumb and fingers.

As shown in FIG. 2, the insert 22 also comprises a bottom non-slip surface 32 containing a plurality of longitudinal ribs 34. This non-slip surface 32 forms a non-slip region on the bottom surface 20 of the handle 16, which is typically engaged by the user's fingers during brushing. As with the non-slip regions formed in the top surface 18, a plurality of such regions may be formed in the bottom surface 20 and the configuration of the non-slip surface 32 may be varied as discussed above.

Figure 4:
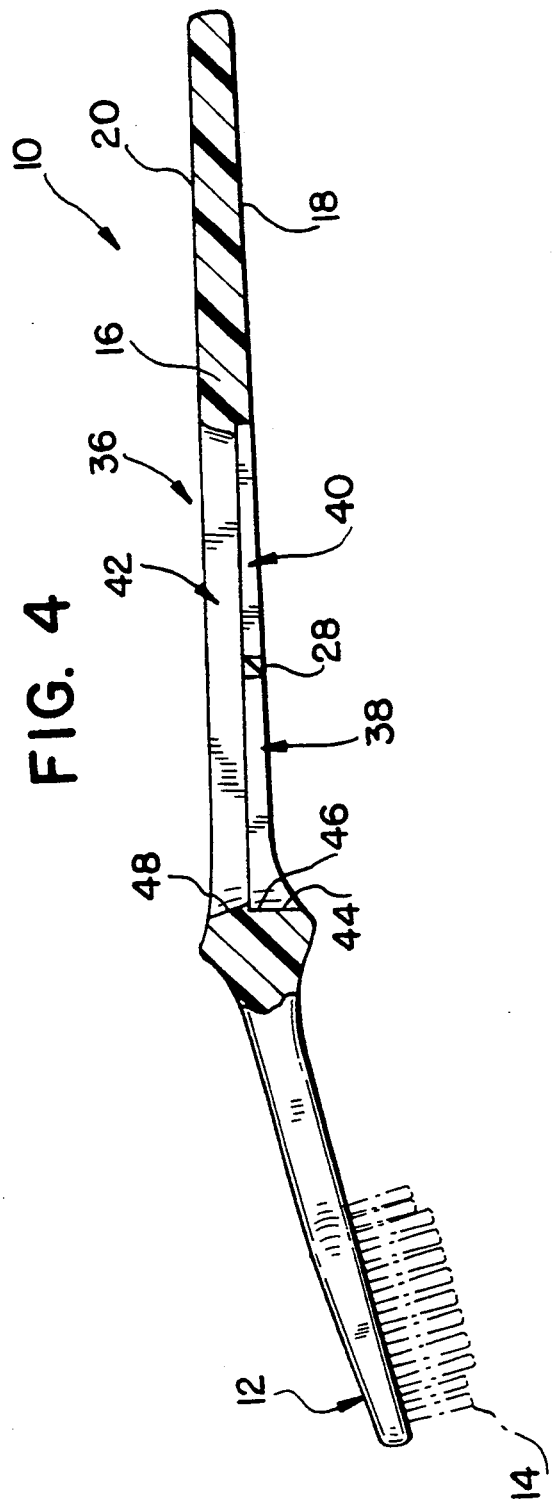
FIG. 4 is a longitudinal cross-sectional view of the toothbrush of FIG. 3 with the insert removed taken along line 4—4.

Turning now to FIGS. 3-6, the means for securing the insert within the handle 20 will be discussed in detail. As shown in FIG. 4, the handle 20 contains an aperture generally designated as 36 extending from the top surface 18 to the bottom surface 20. This aperture 36 is dimensioned to receive and hold the insert 22 within the handle 16. The aperture 36 forms first and second openings 38 and 40, respectively, in the top surface 18 which are separated by the handle rib portion 28. The aperture 36 also forms a single opening 42 in the bottom surface 20 of the handle 16.

Figure 5:
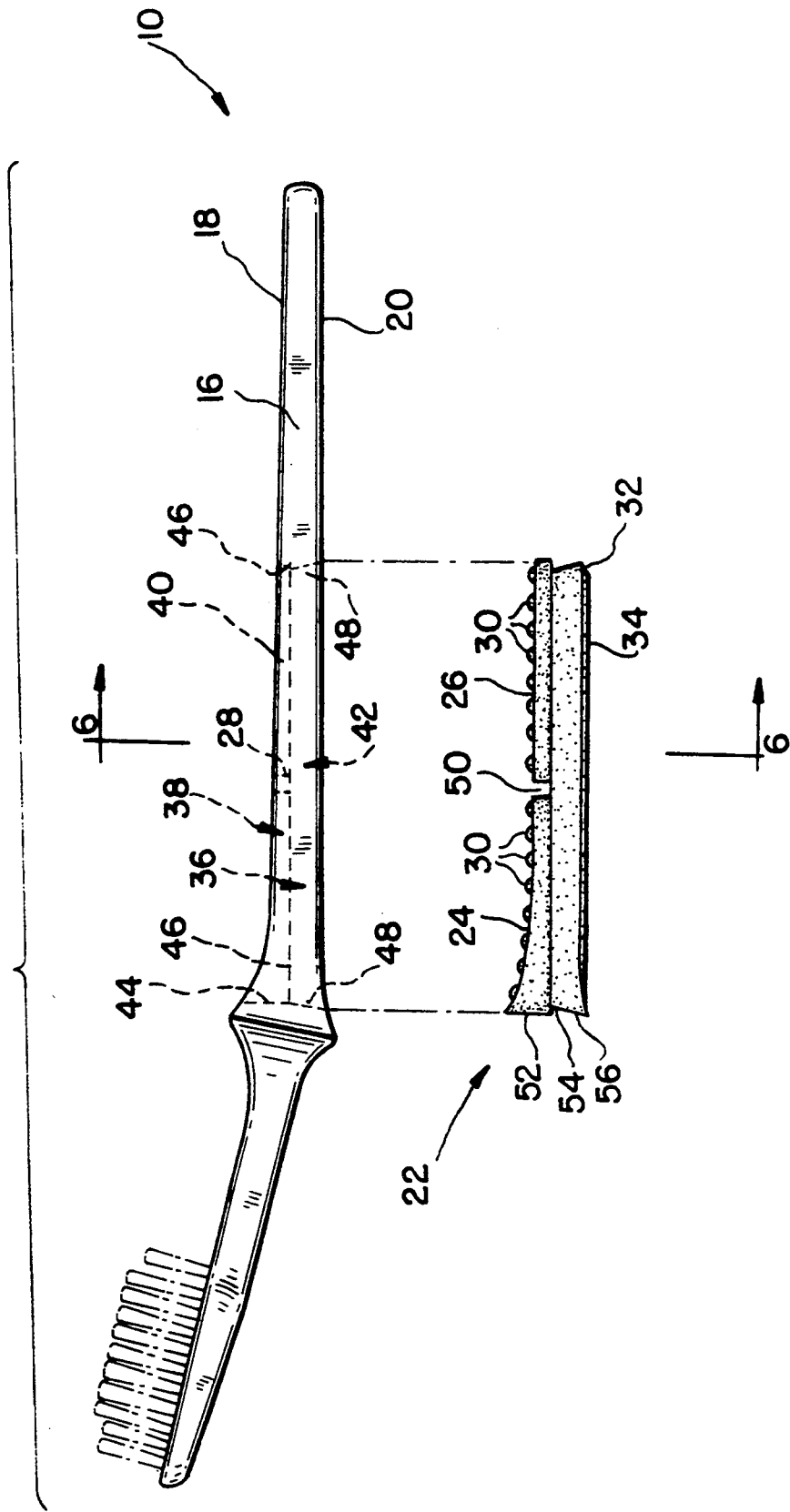
FIG. 5 is a side view of the toothbrush of FIG. 1 with the insert removed from the handle.
Figure 6:
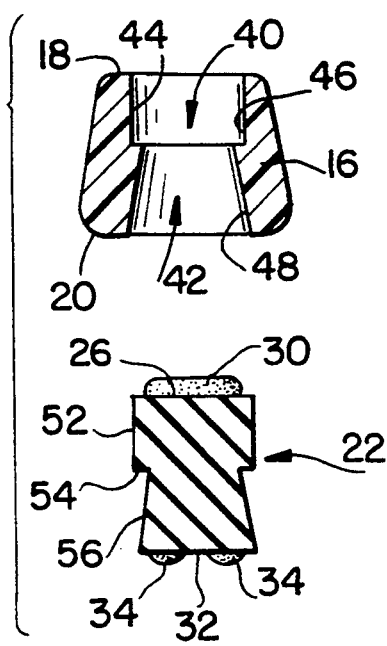
FIG. 6 is an enlarged cross-sectional view of the handle and insert taken along line 6—6 of FIG. 5.

The aperture 36 contains an upper wall 44 which is separated from a beveled, lower wall 48 by a shoulder portion 46. As shown in FIGS. 3 and 5, the shoulder portion 46 extends around the entire periphery of the aperture 36. As shown in FIG. 6, the beveled, lower wall 48 bevels outwardly from the shoulder portion 46 toward the bottom surface 20.

As shown in FIG. 5, the insert 22 contains a notch portion 50 which is dimensioned to receive the bridge 28 formed in the handle 16. The insert 22 also contains an upper wall 52 which is separated from a beveled, lower wall 56 by a shoulder portion 54. The shoulder portion 54 extends around the entire periphery of the insert 22.

When the insert 22 is placed within the handle 20 through the bottom opening 42, the aperture shoulder portion 46 engages the insert shoulder portion 54 in an interlocking relationship, thereby defining an interlocking zone for securing the insert 22 within the aperture 36. The notch portion 50 of the insert 22 engages the bridge portion 28 of the handle 16 to further secure the insert. The lower beveled wall 48 of the aperture 36 also engages the lower, beveled wall 56 of the insert 22 in an interlocking relationship to form an additional interlocking zone for securing the insert 22 within the handle 16.

Figure 7B:
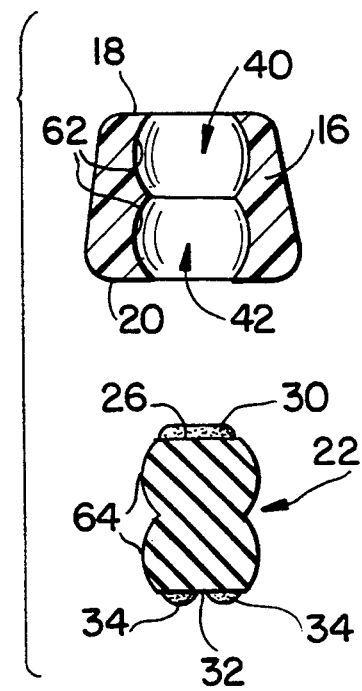
FIGS. 7a, 7b and 7c are alternative, enlarged cross-sectional views of the handle and insert sections shown in FIG. 6.
Figure 7A:
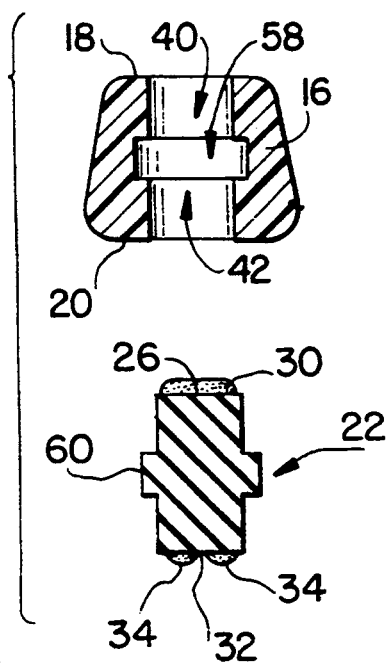
Figure 7C:
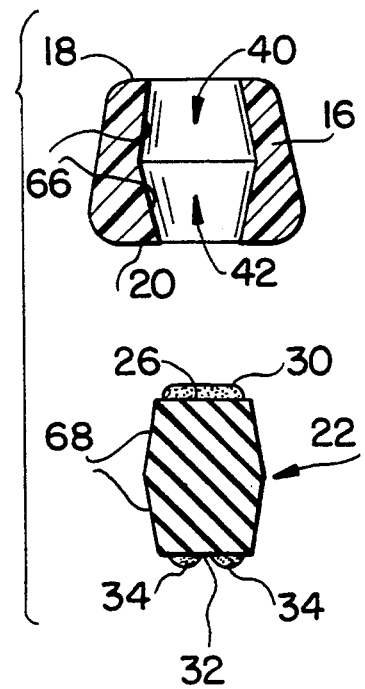

FIGS. 7a, 7b and 7c show several alternative cross-sectional configurations for the aperture and insert walls. In FIG. 7a, the aperture wall in the handle 16 contains a recess 58 which engages a projection 60 formed on the wall of the insert 22.

FIG. 7b shows a similar configuration wherein a pair of concave recesses 62 is formed on the aperture wall in the handle 16. A corresponding pair of convex projections 64 is formed along the wall of the insert 22.

FIG. 7c shows a beveled recess 66 formed on the wall of the aperture in the handle 16. A corresponding beveled projection 68 is formed along the wall of the insert 22. In FIGS. 7a, 7b and 7c, when the insert 22 is placed within the aperture, the projection(s) formed along the wall of the insert 22 engages the recess(s) formed in the wall of the aperture in the handle 16 in an interlocking relationship to form interlocking zone(s) for securing the insert to the handle 16.

The head 12 and the handle 16 of the toothbrush 10 may be molded from a thermoplastic polymer, such as styrene-acrylonitrile copolymers, polypropylene, cellulose acetate, cellulose acetate propionate, and polymethyl methacrylate. The head 12 and the handle 16, containing the aperture 36, may be molded in conventional injection molding equipment.

The bristles 14 are then inserted in the toothbrush head using conventional bristling equipment, e.g. Boucherie, Zahoransky or Evans machines. The bristles 14 are fabricated from various plastic materials, such as polyamides, polyolefins, polyesters, or natural fibers, such as animal hair. Preferably the bristles 14 are nylon.

The insert 22 is fabricated from a material which is compressible, so that this member may be inserted within the handle aperture 36. The insert 22 may be fabricated from an elastomeric material, such as neoprene, urethane, silicone rubber or RTV silicone, and preferably from a thermoplastic injection moldable rubber, such as Santoprene® rubber available from Monsanto Chemical Co. The insert 22 is generally dimensioned slightly larger than the aperture 36 in both the longitudinal and transverse directions so that it is compression-fit within the handle 16. As used herein, compression-fit means that the insert 22 is compressed when it is inserted into the aperture 36, so that the insert walls frictionally engage the walls of the aperture 36. The insert 22 may be molded in conventional injection molding equipment.

Alternatively, if the material used to fabricate the handle 16 is sufficiently pliable, the insert 22 may be fabricated from a material which is not readily compressed, such as metals or hard plastics. For example, the insert 22 may be molded from aluminum, and then inserted into the handle 16 having a pliable aperture wall. The wall must be capable of deforming to the extend necessary for the insert 22 to be inserted into the aperture, so that the opposed shoulders 46 and 54, or the projections and recesses shown in FIGS. 7a, 7b and 7c, interlock to secure the insert 22 within the handle 16.

Conventional molding equipment is used to manufacture the toothbrush 10. The toothbrush 10, comprising the head 12 and the handle 16, is formed in a separate molding operation from the insert 22. Once the two component parts are formed, the insert 22 is then inserted within the handle aperture 36 in an interlocking relationship, so as to secure the insert within the toothbrush handle 16. This step may be done either manually or with automated equipment. The tufting operation for the bristles 14 may be carried out during virtually any stage of the manufacturing process.

The foregoing description and drawings are intended to be illustrative of the present invention. Various changes and modifications can be made to the above-described embodiments without departing from the spirit and scope of the present invention.

What is claimed is:

1. A toothbrush comprising:
   a handle having a first handle surface and an opposed handle surface;
   a bristled head connected to said handle;
   an aperture disposed through said handle, from said first handle surface to said opposed handle surface, said aperture being defined by an aperture peripheral wall generally transverse to said handle surfaces and having an insert therein;
   said insert having a first non-slip insert surface forming a non-slip region on the first handle surface, an opposed insert surface being disposed essentially co-planar with the opposed handle surface, and an insert peripheral wall generally transverse to said insert surfaces;
   said aperture wall having an aperture shoulder extending into the aperture;
   said insert having an insert shoulder extending into the aperture;
   said shoulders being in face-to-face relationship and bearing against each other to resist a force attempting to translate the insert out of the aperture.

2. The toothbrush of claim 1 wherein said insert shoulder faces toward said opposed handle surface and said aperture shoulder faces toward said first handle surface whereby said shoulders resist a force attempting to translate the insert out of the aperture in a direction from the first handle surface to the opposed handle surface but not in an opposite direction.

3. The toothbrush of claim 2 wherein said aperture further comprises a bridging portion extending across the aperture and joining opposed portions of the aperture peripheral wall, said bridging portion bearing against the first non-slip insert surface to resist a force attempting to translate the insert out of the aperture in the direction of from the opposed handle surface to the first handle surface.

4. The toothbrush of claim 1 wherein said insert comprises a compressible material and is compression-fit within said aperture.

5. The toothbrush of claim 1 wherein said opposed insert surface is also a non-slip surface.

6. The toothbrush of claim 1 wherein said handle comprises a plurality of apertures and inserts.

7. A toothbrush comprising:
   a handle having a first handle surface and an opposed handle surface;
   a bristled head connected to said handle;
   an aperture disposed through said handle, from said first handle surface to said opposed handle surface, said aperture being defined by an aperture peripheral wall generally transverse to said handle surfaces and having an insert therein;
   said insert having a first non-slip insert surface forming a non-slip region on the first handle surface, an opposed insert surface being disposed essentially co-planar with the opposed handle surface, and an insert peripheral wall generally transverse to said insert surfaces;
   said toothbrush having securing means for securing said insert within said aperture, said securing means comprising an interlocking region on the peripheral wall of the insert and an interlocking region on the peripheral wall of the aperture; wherein one of said interlocking regions is a recess, recessed from the aperture and the other is a projection, projecting into the aperture; said recess and said projection cooperating to bear against each other and resist any force tending to translate the insert out of the aperture.

8. The toothbrush of claim 7 wherein said aperture further comprises a bridging portion extending across the aperture and joining opposed portions of the aperture peripheral wall, said bridging portion bearing against the first non-slip insert surface to resist a force attempting to translate the insert out of the aperture in the direction of from the opposed handle surface to the first handle surface.

9. The toothbrush of claim 7 wherein said insert comprises a compressible material and is compression-fit within said aperture.

10. The toothbrush of claim 7 wherein said opposed insert surface is also a non-slip surface.

11. The toothbrush of claim 7 wherein said handle comprises a plurality of apertures and inserts.

* * * * *